US008743364B2

(12) United States Patent
Krause et al.

(10) Patent No.: US 8,743,364 B2
(45) Date of Patent: Jun. 3, 2014

(54) METHOD AND SYSTEM FOR MATCHING COLOR AND COARSENESS APPEARANCE OF COATINGS

(75) Inventors: Hartmut Krause, Wermelskirchen (DE); Larry Eugene Steenhoek, Wilmington, DE (US); Wolfgang Joachim Küpper, Wuppertal (DE); Allan Blase Joseph Rodrigues, Bloomfield Hills, MI (US); Wilhelm Kettler, Wuppertal (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 69 days.

(21) Appl. No.: 13/513,255

(22) PCT Filed: Oct. 20, 2010

(86) PCT No.: PCT/US2010/053287
§ 371 (c)(1),
(2), (4) Date: Jun. 1, 2012

(87) PCT Pub. No.: WO2011/068600
PCT Pub. Date: Jun. 9, 2011

(65) Prior Publication Data
US 2012/0236309 A1   Sep. 20, 2012

Related U.S. Application Data

(60) Provisional application No. 61/265,842, filed on Dec. 2, 2009.

(51) Int. Cl.
*G01N 21/25* (2006.01)
*G01J 3/46* (2006.01)

(52) U.S. Cl.
CPC ... *G01J 3/46* (2013.01); *G01J 3/463* (2013.01)
USPC .......................................................... 356/408

(58) Field of Classification Search
USPC .................................................. 356/402–425
See application file for complete search history.

(56) References Cited

U.S. PATENT DOCUMENTS 6,270,123 B1   8/2001   Spangler
(Continued)

FOREIGN PATENT DOCUMENTS

WO   2009075728 A1   6/2009

OTHER PUBLICATIONS

Mexican Institute of Industrial Property, Office Action in Mexican Patent Application No. MX/a/2012/006218, mailed Nov. 19, 2013.

(Continued)

*Primary Examiner* — Abdullahi Nur
(74) *Attorney, Agent, or Firm* — Ingrassia Fisher & Lorenz, P.C.

(57) ABSTRACT

The present invention is directed to a method and a system for producing one or more matching formulas to match color and coarseness appearance of a target coating on a substrate. The method provides providing a set of coating chips comprising at least two coating chips having different lightness values, and at least two coating chips having matching lightness values and different coarseness values. This invention provides a simple method and the system for matching color and coarseness appearance of the surface coating.

20 Claims, 5 Drawing Sheets

(56) References Cited

U.S. PATENT DOCUMENTS

| | | |
|---|---|---|
| 7,035,464 B2 | 4/2006 | Masuda |
| 2006/0181707 A1* | 8/2006 | Gibson et al. .................. 356/402 |
| 2007/0097119 A1 | 5/2007 | Steenhoek et al. |
| 2007/0250273 A1 | 10/2007 | De Haas et al. |
| 2007/0273890 A1 | 11/2007 | Njo |
| 2008/0138627 A1 | 6/2008 | Swarup et al. |
| 2009/0157212 A1 | 6/2009 | McClanahan et al. |

OTHER PUBLICATIONS

Mexican Institute of Industrial Property, Office Action in Mexican Patent Application No. MX/a/2012/006218, mailed Jul. 11, 2013.

Mexican Institute of Industrial Property, Response to Office Action in Mexican Patent Application No. MX/a/2012/006218, mailed Sep. 25, 2013.

International Searching Authority, International Search Report and Written Opinion for PCT International Application No. PCT/US10/53287, mailed Dec. 16, 2010.

* cited by examiner

METHOD AND SYSTEM FOR MATCHING COLOR AND COARSENESS APPEARANCE OF COATINGS

CROSS-REFERENCE TO RELATED APPLICATION

This application claims priority under 35 U.S.C. §119 from U.S. Provisional Application Ser. No. 61/265,842 (filed Dec. 2, 2009), the disclosure of which is incorporated by reference herein for all purposes as if fully set forth.

FIELD OF INVENTION

The present invention is directed to a method for matching color and appearance of a target coating on a substrate. This invention is particularly directed to a method for producing one or more matching formulas to match color and coarseness appearance of a target coating on a substrate.

BACKGROUND OF INVENTION

Besides colorants or color pigments, effect pigments, such as metallic flakes, are widely used for producing coatings having desired appearance and aesthetic effects. The use of effect pigments in a coating can impart a differential light reflection effect, color changing effect upon varying viewing or illumination conditions, sparkle effect, coarseness, as well as the enhancement of depth perception in the coating. Aluminum flakes, a type of metallic flakes, are commonly used as effect pigments in coatings for automobile bodies and other articles. For repairing a previously coated article that has a coating comprising effect pigments, for example, an automotive body, it is necessary to choose the correct colorants or colorant combinations to match the color of that coated article as well as the correct effect pigments such as flakes to match both the color and appearance of that coated article.

There are needs for a method and a system to match color and appearance of coatings.

STATEMENT OF INVENTION

This invention is directed to a method for matching color and appearance of a target coating on a substrate, said method comprising the steps of:
a) providing a set of coating chips each having a chip coating layer thereon and a coarseness value and a lightness value corresponding to coarseness and lightness of said chip coating layer, said set of coating chips comprise at least two coating chips having different lightness values, and at least two coating chips having matching lightness values and different coarseness values;
b) obtaining target color data of said target coating and producing a target lightness value based on said target color data;
c) obtaining a target coarseness value of said target coating by a coarseness determination process comprising the steps of: i) selecting from said coating chips one or more preliminary matching chips having lightness values that match the target lightness value, ii) selecting from said preliminary matching chips one or more matching chips by comparing chip coating layers of said preliminary matching chips with the target coating, and iii) producing said target coarseness value based on coarseness values of the matching chips; and
d) retrieving one or more preliminary matching formulas from a formula database based on the target color data and the target coarseness value, said formula database comprises coating formulas associated with color data, coarseness values, and lightness values.

This invention is also directed to a system for matching color and appearance of a target coating on a substrate, said system comprising: a set of coating chips each having a chip coating layer thereon and a coarseness value and a lightness value corresponding to coarseness and lightness of said chip coating layer, said set of coating chips comprise at least two coating chips having different lightness values, and at least two coating chips having matching lightness values and different coarseness values.

BRIEF DESCRIPTION OF DRAWING

FIG. 2 shows further examples of sets of coating chips. Only the chips at one lightness value are shown. (A) Coating chips 21a-21e are arranged into a strip (21) without viewing openings. (B) Coating chips 22a-22e are arranged into a strip (22) having one or more viewing openings (23) on each of the chips. (C) Coating chips are arranged in a fandeck form (24) held together by a fixture (26). (D) Coating chips, each having one or more viewing openings (23), are arranged in a fandeck form (25) held together by a fixture (26).

FIG. 3 shows further examples of sets of coating chips. Only the coating chips having 3 lightness values and 5 coarseness values are shown. The set of coating chips can have more lightness values and/or coarseness values. The coating chips can have different lightness values as presented in 41-43. At each lightness value, there can be a plurality of coating chips 31-35 having different coarseness values. (A) Coating chips have one or more viewing openings. (B) Coating chips without the viewing openings.

DETAILED DESCRIPTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein, The term "pigment" or "pigments" refers to a colorant or colorants that produce color or colors. A pigment can be from natural or synthetic sources and can be made of organic or inorganic constituents. Pigments can also include metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Flakes, such as metallic flakes, for example aluminum flakes, are examples of such effect pigments. Effect pigments can also include pearlescent pigments.

The term "gonioapparent flake" or "gonioapparent flakes" refers to flakes which change color or appearance, or a combination thereof, with change in viewing angles or illumination conditions including, nut not limited to illumination light intensities, illumination spectral power distributions, illumination light angles, and a combination thereof. Metallic flakes, such as aluminum flakes are examples of gonioapparent flakes.

The term "dye" means a colorant or colorants that produce color or colors. Dye is usually soluble in a coating composition.

The term "appearance" can include: (1) the aspect of visual experience by which a coating is viewed or recognized; and (2) perception in which the spectral and geometric aspects of a coating is integrated with its illuminating and viewing environment. In general, appearance includes texture, coarseness, sparkle, or other visual effects of a coating, especially when viewed from varying viewing angles and/or with varying illumination conditions. Appearance characteristics or appearance data can include, but not limited to, descriptions or measurement data on texture, metallic effect, pearlescent effect, gloss, distinctness of image, flake appearances and sizes such as texture, coarseness, sparkle, glint and glitter as well as the enhancement of depth perception in the coatings imparted by the flakes, especially produced by metallic flakes, such as aluminum flakes. Appearance characteristics can be obtained by visual inspection or by using an appearance measurement device.

The term "color data" or "color characteristics" of a coating can comprise measured color data including spectral reflectance values, X,Y,Z values, L,a,b values, L*,a*,b* values, L,C,h values, or a combination thereof. Color data can further comprise a color code of a vehicle, a color name or description, or a combination thereof. Color data can even further comprise visual aspects of color of the coating, chroma, hue, lightness or darkness. The color data can be obtained by visual inspection, or by using a color measurement device such as a colorimeter, a spectrophotometer, or a goniospectrophotometer. The color data can also comprise descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by an appearance measuring device or a color-appearance dual measuring device.

The term "coating" or "coating composition" can include any coating compositions known to those skilled in the art and can include a two-pack coating composition, also known as "2K coating composition"; a one-pack or 1K coating composition; a coating composition having a crosslinkable component and a crosslinking component; a radiation curable coating composition, such as a UV curable coating composition or an E-beam curable coating composition; a mono-cure coating composition; a dual-cure coating composition; a lacquer coating composition; a waterborne coating composition or aqueous coating composition; a solvent borne coating composition; or any other coating compositions known to those skilled in the art. The coating composition can be formulated as a primer, a basecoat, or a color coat composition by incorporating desired pigments or effect pigments. The coating composition can also be formulated as a clearcoat composition.

The term "vehicle", "automotive", "automobile" or "automotive vehicle" can include an automobile, such as car, bus, truck, semi truck, pickup truck, SUV (Sports Utility Vehicle); tractor; motorcycle; trailer; ATV (all terrain vehicle); heavy duty mover, such as, bulldozer, mobile crane and earth mover; airplanes; boats; ships; and other modes of transport.

The term "database" refers to a collection of related information that can be searched and retrieved. The database can be a searchable electronic numerical, alphanumerical or textual document; a searchable PDF document; a Microsoft Excel® spreadsheet; a Microsoft Access® database (both supplied by Microsoft Corporation of Redmond, Wash.); an Oracle® database (supplied by Oracle Corporation of Redwood Shores, Calif.); or a Linux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases.

A "computing device" refers to a desktop computer, a laptop computer, a pocket PC, a personal digital assistant (PDA), a handheld electronic processing device, a smart phone, an iPod, an iPod/MP Player, or any other electronic devices that can process information automatically. A computing device may have a wired or wireless connection to a database or to another computing device. A computing device can be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A computing device can further be a subunit of another device. Examples of such a subunit can be a processing chip in an imaging device, a spectrophotometer, or a goniospectrophotometer. A computing device can be connected to a display device, such as a monitor screen. A "portable computing device" includes a laptop computer, a pocket PC, a personal digital assistant (PDA), a handheld electronic processing device, a mobile phone, a smart phone, a tablet computer, an iPod, an iPod/MP Player, or any other stand alone or subunit devices that can process information and data and can be carried by a person.

Wired connections can include hardware couplings, splitters, connectors, cables or wires. Wireless connections and devices can include, but not limited to, Wi-Fi device, Bluetooth device, wide area network (WAN) wireless device, Wi- Max device, local area network (LAN) device, 3G or 4G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

A display device can be a computer monitor, a projector, a TV screen, a personal digital assistant (PDA) device, a cell phone, a smart phone, an iPod, an iPod/MP Player, a flexible thin display, or any other devices that can display information or image based on digital signals. The display device can also be a printing device that prints, based on digital signals, information or image onto papers, plastics, textiles, or any other surfaces that are suitable for printing the information or image onto. The display device can also be a duel functional display/data input device, such as a touch screen.

The term "formula", "matching formula" or "matching formulation" for a coating composition refers to a collection of information or instruction, based upon that, the coating composition can be prepared. In one example, a matching formula comprises a list of names and quantities of pigments, effect pigments, and other components of a coating composition. In another example, a matching formula comprises instructions on how to mix multiple components of a coating composition.

Figure 4:
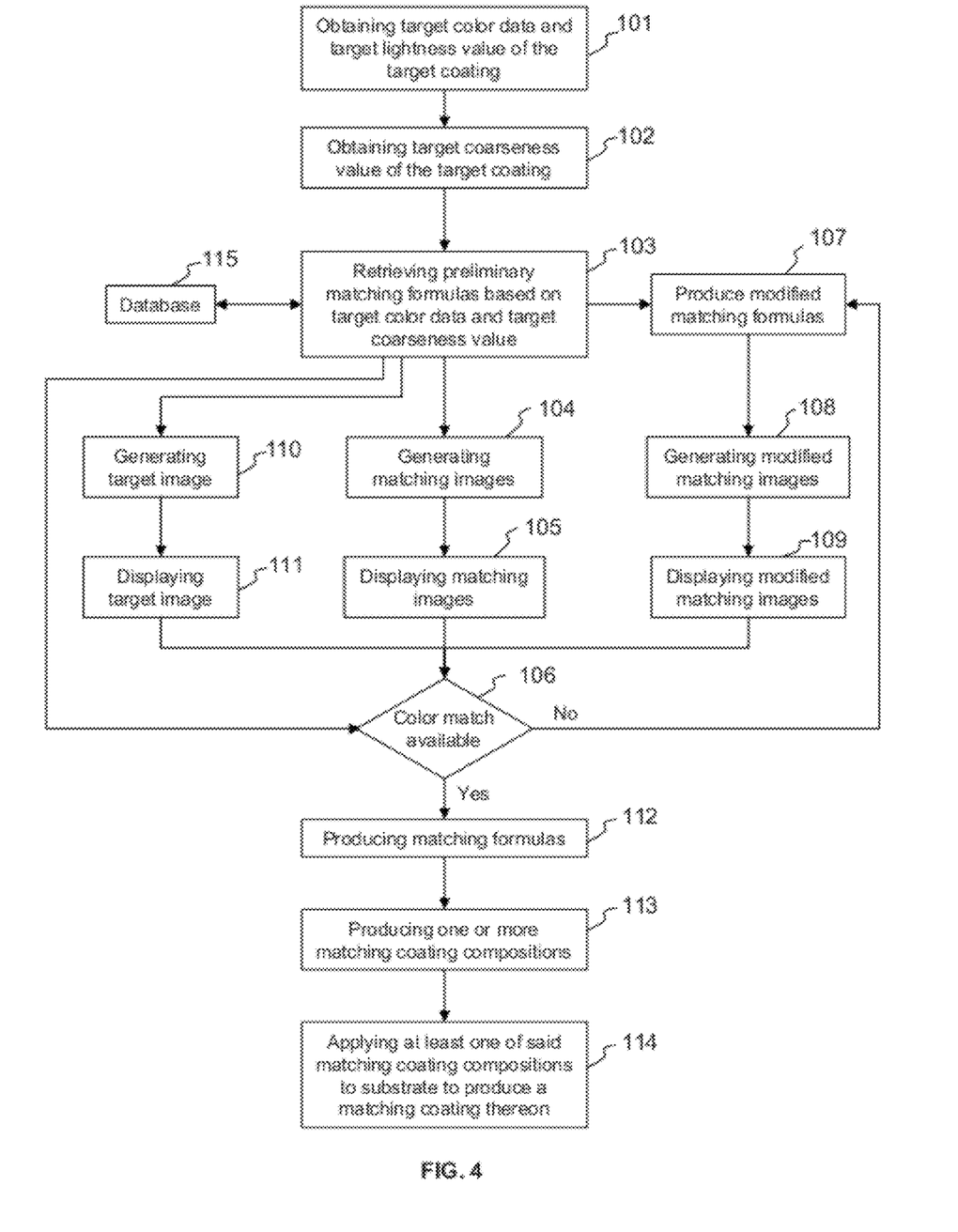
FIG. 4 shows an example of the process representing the method disclosed herein.

This invention is directed to a method for matching color and appearance of a target coating on a substrate. The method can comprise the steps of:
  a) providing a set of coating chips each having a chip coating layer thereon and a coarseness value and a lightness value corresponding to coarseness and lightness of said chip coating layer, said set of coating chips comprise at least two coating chips having different lightness values, and at least two coating chips having matching lightness values and different coarseness values;
  b) obtaining target color data of said target coating and producing a target lightness value based on said target color data (101);
  c) obtaining a target coarseness value (102) of said target coating by a coarseness determination process comprising the steps of: i) selecting from said coating chips one or more preliminary matching chips having lightness values that match the target lightness value, ii) selecting from said preliminary matching chips one or more matching chips by comparing chip coating layers of said preliminary matching chips with the target coating, and iii) producing said target coarseness value based on coarseness values of the matching chips;
  d) retrieving one or more preliminary matching formulas (103) from a formula database (115) based on the target color data and the target coarseness value, said formula database comprises coating formulas associated with color data, coarseness values, and lightness values.

If color and appearance match is available (106), one or more matching formulas (112) can be produced by selecting from said preliminary matching formulas.

The method can further comprise the steps of:
  e) generating one or more matching images (104) based on said preliminary matching formulas and coarseness values associated with said preliminary matching formulas and displaying said matching images (105) on a display device.

When the matching images are generated and color and appearance match is available, the method can further comprise the steps of:

f) producing one or more matching formulas (112) by selecting from said preliminary matching formulas based on the comparison of said matching images and said target coating.

The method can further comprise the steps of:
  g) generating a target image (110) based on the target color data and said target coarseness value and displaying said target image (111) on said display device; and
  h) producing one or more matching formulas (112) by selecting from said preliminary matching formulas based on the comparison of said matching images with said target image, or based on the comparison of said matching images with said target coating.

If the color or appearance match is not available (106), the method of this disclosure can further comprise the steps of modifying said one or more matching formulas to produce one or more modified matching formulas (107), generating one or more modified matching images (108) based on said one or more modified matching formulas, and displaying at least one of said modified matching images (109) on said display device. The modified matching image can be generated and displayed as a realistic modified image. The modified matching formulas can also be directly modified from the step 103 to the step 107 (FIG. 4) if so desired. The modified matching formulas can be produced by generating modified color data, modified lightness values, modified coarseness values, or a combination thereof. The modified matching formulas can also be retrieved from the formula database based on the modified color data, the modified lightness values, the modified coarseness values, or a combination thereof. The modified matching formulas can also be generated by interpolating formulas stored in the formula database that have similar color data, lightness values, coarseness values, or a combination thereof. The modified matching formulas can also be generated by changing one or more of the ingredients or components in the formulas stored in the formula database.

The target color data can comprise measurement data that can indicate a lightness value of the target coating, herein referred to as target lightness value. The target color data and the color data stored in the formula database can comprise any one or more of spectral reflectance values, XYZ values, L,a,b values, L*,a*,b* values, L,C,h values, or a combination thereof. The target color data can be produced from a color measuring device, an appearance measuring device or a color-appearance dual measuring device. The color measuring device can be a colorimeter, a spectrophotometer, or a goniospectrophotometer. Any suitable colorimeter or spectrophotometer, such as Model SP64 manufactured by X-Rite, Grandville, Mich. can be used. A goniospectrophotometer is also known as multi-angle spectrophotometer. Any suitable Goniospectrophotometers, such as Model MA68II from X-Rite, Grandville, Mich., or the ones provided by Murakami Color Research Laboratory, Tokyo, Japan, can be used. Examples of appearance or color-appearance dual measuring device can include BYK-mac, available from BYK-Gardner USA, Columbia, Md., that measures both multi-angle color and flake characterization. Typically, the target color data can be measured at one or more different angles, such as some or all of the angles at about 15°, 25°, 45°, 75°, or 110°, wherein definitions of angles can be specified by instrument manufacturers. Some devices can also measure color or appearance data at −15°. In one example, the target color data are measured at one mid aspecular angle of 45°. In another example, the target color data are measured at three angles of 15°, 45°, and 75°. In yet another example, the target color data are measured at five angles of 15°, 25°, 45°, 75°, and 110°. The lightness value can be derived from the target color data. Typically, L or L* in L,a,b or L*,a*,b* color data defines the lightness value. The lightness value can therefore be derived from the L,a,b values or L*,a*,b* values. Lightness values are critical for determining right coarseness value of a coating that has effect pigments. Coarseness of a coating having one or more effect pigments is related to the apparent size of the effect pigments in the coating when viewed by a person. The effect pigments of the same concentration and size distribution may have different apparent coarseness in coatings of different lightness. One advantage of the method disclosed herein is that coarseness values can be related to lightness value of the coating therefore providing better color and coarseness match.

The target color data can further comprise descriptive data such as a color code of a vehicle, color name, a vehicle identification number (VIN), a part of a VIN, or a combination thereof. It is understood that the target color data need to be compatible with color data stored in the formula database. For example, if the target color data comprise spectral reflectance values or L*,a*,b* values, the color data in the formula database need to have the spectral reflectance values or other values that can be compatible with the target color data. In another example, the formula database comprises color data having L*,a*,b* values, a color measuring device that can be capable of producing L*,a*,b* values or other measurement values that can be converted to L*,a*,b* values can be used.

Color data stored in the formula database can also be associated with other descriptive data such as vehicle identification numbers (VIN) or a part of a VIN. A VIN or part of a VIN can be used to search such formula database for matching formulas.

Once the target color data are obtained, the target lightness value can be displayed on a display screen of the color measuring device, printed onto paper or other printing media, outputted from the color measuring device to another display device, or directly outputted from the color measuring device to a computing device via wired or wireless connections. Coating chips having lightness values matching the target lightness value can be selected as preliminary matching chips (201, FIG. 5).

The coating chips can be have lightness values selected from actual color data values, actual lightness values, lightness ID values, index values, or a combination thereof. In one example, 25 coating chips can be arranged into 5 lightness groups each having a lightness ID value assigned, such as L1-L5. Each lightness ID value can be used to match a range of color data values or actual lightness values. For example, coating chips with a lightness ID value of L1 can match target lightness values in a range of from 5 to 20, or any lightness values under 20. In another example, coating chips with a lightness ID value of L2 can match target lightness values in a range of from 21 to 40. The range of lightness ID values and the matching lightness values can be arranged as desired without departing from the scope of this invention.

The coating chips within each lightness group can have matching lightness values and different coarseness values. The coarseness values can be selected from actual coarseness measurement data values, coarseness ID values, index values, or a combination thereof. In one example, each lightness group can have 5 coating chips each having matching lightness values and different coarseness values. The coating chips can have coarseness ID values such as C1-C5. Each coating chip can match coatings with a range of coarseness values.

Each coating chip from the set can have a unique chip ID value that can identify lightness and coarseness values of the coating chip. In one example, the coating chips in L1 lightness group can have chip IDs such as L1C1-L1C5, the coating chips in L5 lightness group can have chip IDs such as L5C1-L5C5, and so on.

Figure 1:
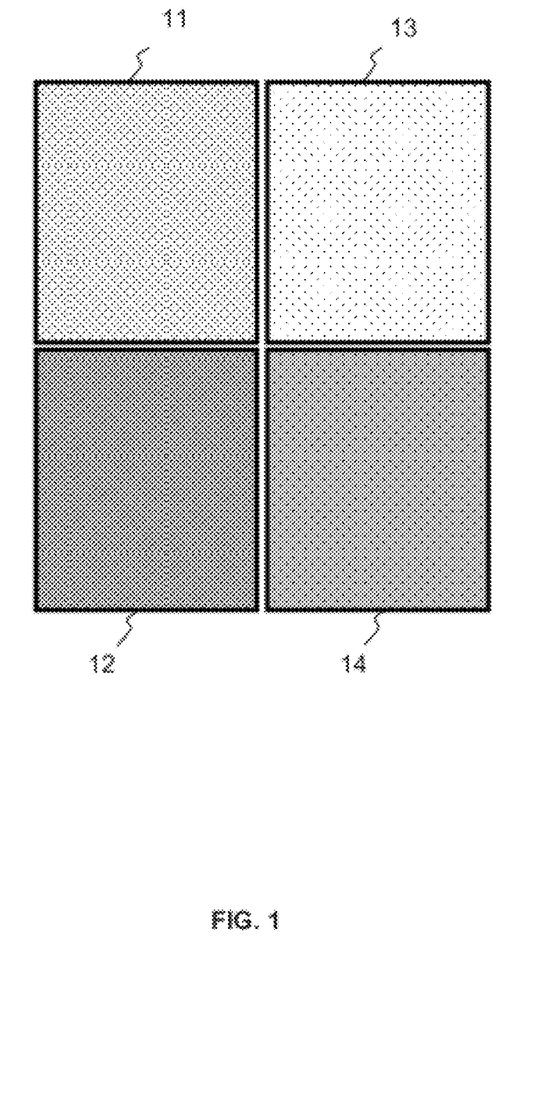
FIG. 1 shows an example of a set of coating chips comprising at least two coating chips (11 and 13, or 12 and 14) having matching lightness values and different coarseness values, and at least two coating chips (11 and 12, or 13 and 14) having different lightness values.
Figure 2A:
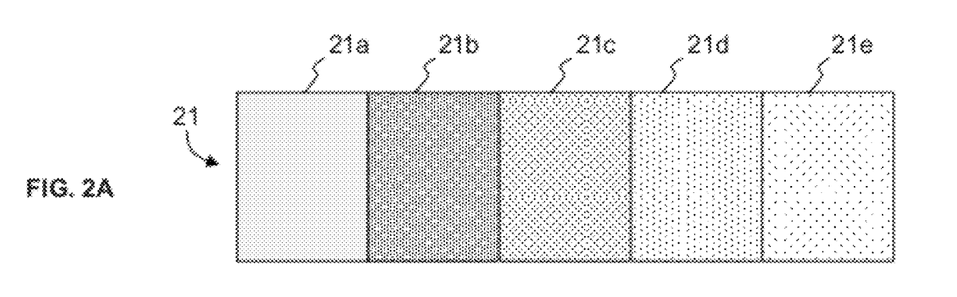
Figure 2B:
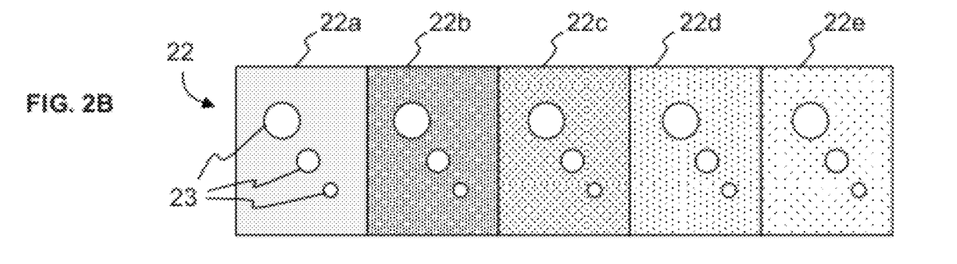
Figure 2C:
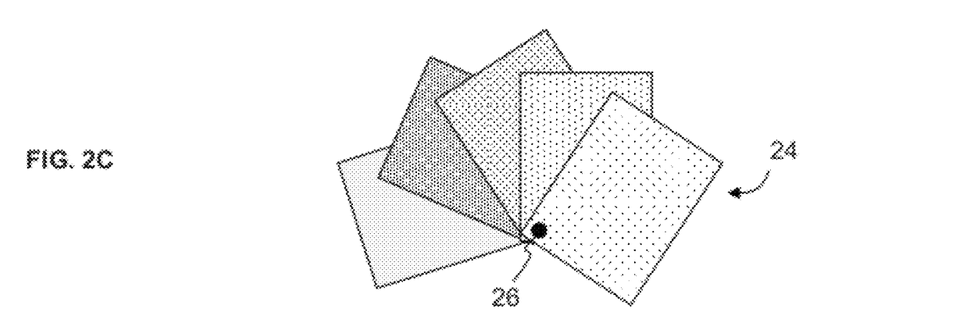
Figure 2D:
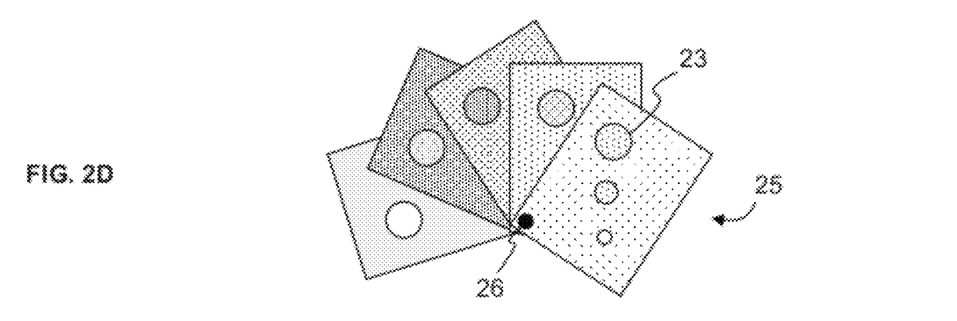

The set of coating chips can comprise at least two coating chips having different lightness values, and at least two coating chips having matching lightness values and different coarseness values. Typically, the set of coating chips can have 2 to 20 different coarseness values and 2 to 20 lightness values. FIG. 1 shows one example of the set of coating chips comprises two coating chips having matching lightness values and different coarseness values (11 and 13, or 12 and 14, FIG. 1). The same set of coating chips also comprises two coating chips having different lightness values (11 and 12, or 13 and 14, FIG. 1). Examples of coating chips can also include the ones shown in FIG. 2 and FIG. 3.

The coating chips can be assembled in various forms of strips in that multiple coating chips can be arranged side-by-side. Examples can include a first chip strip 21 having coating chips 21a-21e in FIG. 2A and a second chip strip 22 having coating chips 22a-22e in FIG. 2B. The coating chips in each chip strip, such as the first chip strip 21, can have matching lightness values and different coarseness values. The coating chips can also be assembled in a form of fandeck in that multiple coating chips can be stacked in a pile and held together at one portion of each of the chips by a fixture (26) so that the multiple chips can be freely spread out like a "fan" to display each of the chips. Examples can include a first chip fandeck 24 shown in FIG. 2C and a second chip fandeck 25 in FIG. 2D. Each of the coating chips can have one or more viewing openings (23) so when the chips are placed over the target coating, color and coarseness of the target coating can be viewed through the viewing openings. Coating chips having matching lightness values can be arranged into one strip or one fandeck. Coating chips having different lightness values can also be arranged into one strip or one fandeck.

Figure 3A:
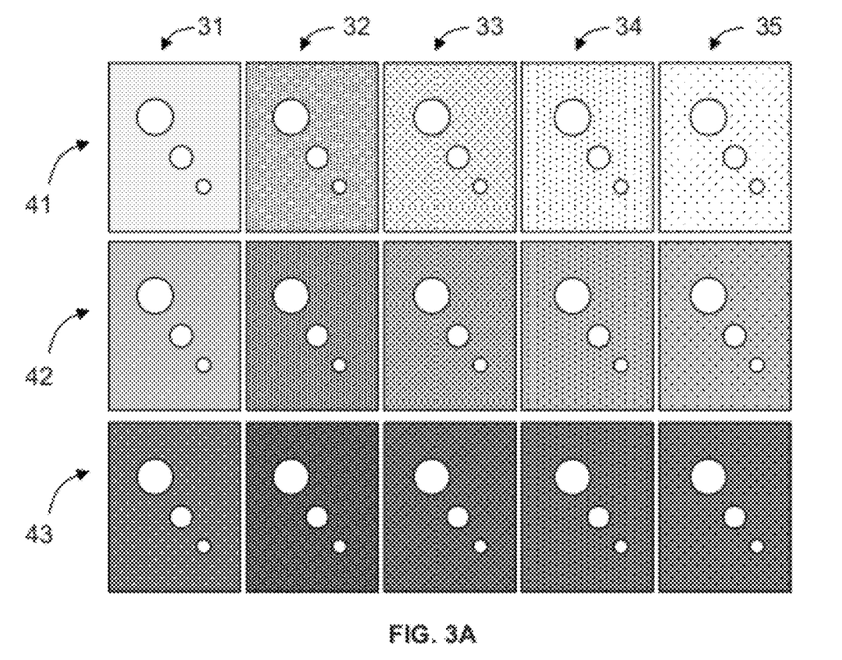
Figure 3B:
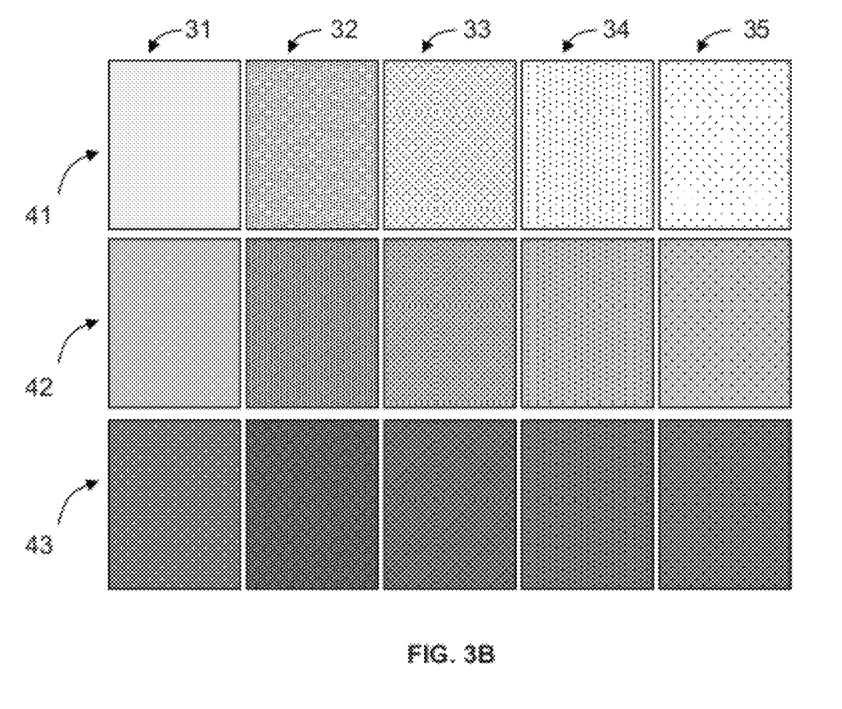

Further examples of the set of coating chips can include the ones shown in FIG. 3A and FIG. 3B in that each of the coating chips can be stand alone. The coating chips can have different coarseness values 31-35 and different lightness values 41-43. Each of the coating chips can have a chip ID value.

The coating layers can be on one surface of each of the chips. The other surface of each chip can have identification information such as lightness value, coarseness value, coating formula identification, chip ID value, or any other information useful for identify the coating chip. To reduce the total number of chips, the coating chips can also have coating layers on both surfaces of each of the chips.

After obtaining the target color data, the target lightness values can be produced and preliminary matching chips can be selected. In one example, the target color data measured using a Goniospectrophotometer at 45° angle can produce a target lightness value of 40. The coating chips having a chip ID value of L2 can match lightness values in a range of 30-50. The coating chips having chip ID value L2 can be selected as preliminary matching chips. Depending on the chip set used, the number of preliminary matching chips can range from 2 to 20, or any number of coating chips having lightness values matching the target lightness value.

Figure 5:
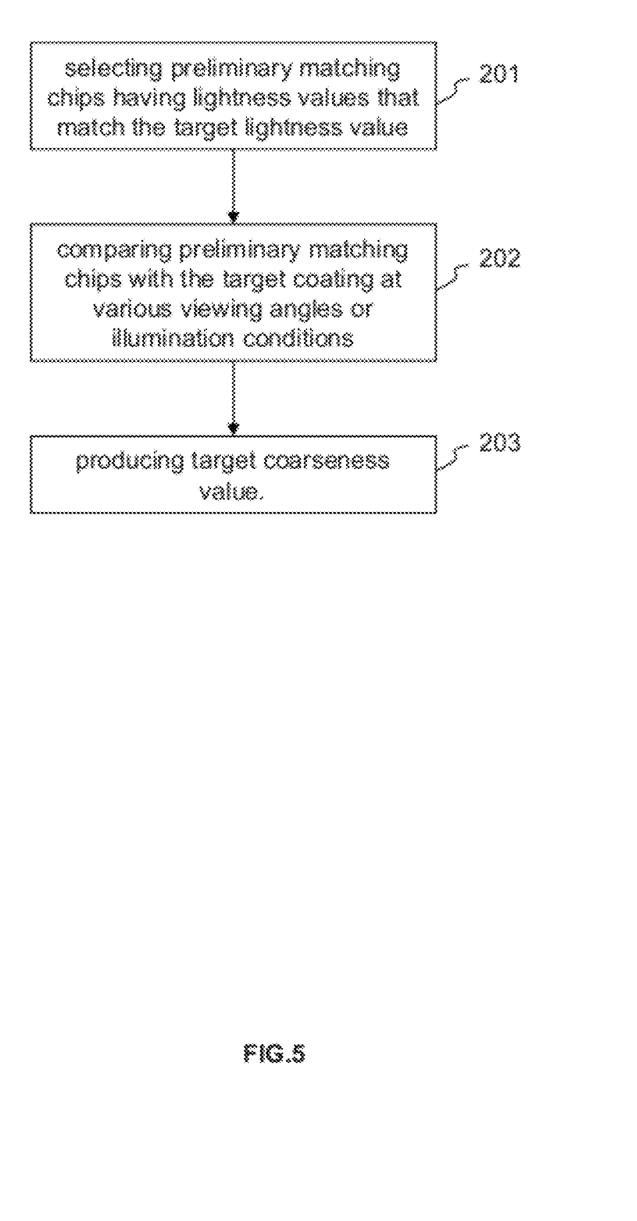
FIG. 5 shows an example of the process for obtaining coarseness values.

The preliminary matching chips can be positioned close to or directly over the target coating. Coarseness of the target coating and the preliminary matching chips can be compared visually under one or more viewing angles, one or more illumination conditions, or a combination thereof. The viewing angles can range from near 90 degree meaning viewing from near the surface of the target coating to about 0 degree meaning viewing perpendicularly relative to the surface of the target coating. The illumination conditions can include different illumination light intensities, different illumination spectral power distributions, different illumination light angles, and a combination thereof. The coating chips that provide the closest match to the target coating in terms of coarseness can be selected as matching chips (202). The target coarseness value can be determined based on the coarseness values of the matching chips (203). In one example, a coating chip having lightness value of L4 and coarseness value of C3 is selected as the matching chip having a chip ID value of L4C3. In another example, coating chips having lightness value L4 and coarseness values C3 and C4 are selected as matching chips having chip ID values of L4C3 and L4C4, respectively. It is understood that the target coarseness value needs to be compatible with the coarseness value comprised in the formula database. In one example, the formula database comprises formulas associated with coarseness values ranging from aforementioned values of C1 to C5, the coarseness values of the matching chips can be directly used as the target coarseness value. In another example, the formula database comprises coarseness values in a different format system and the coarseness values of the matching chips need to be converted to the target coarseness value compatible with the format system of the formula database.

In the step c) of the method, the coarseness determination process can consist of the steps of: i) selecting from said coating chips one or more preliminary matching chips having lightness values that match the target lightness value, ii) selecting from said preliminary matching chips one or more matching chips by comparing chip coating layers of said preliminary matching chips with the target coating, and iii) producing said target coarseness value based on coarseness values of the matching chips.

One or more preliminary matching formulas can be retrieved from the formula database based on the target color data and the target coarseness value. Retrieving formulas from a formula database based on color data are known to those skilled in the art. The method disclosed herein further requires the target coarseness value. The method requires that the formula database comprises coarseness values compatible with the target coarseness values, in addition to the color data. The formula database can comprise color data compatible with the target color data. The target color data comprise aforementioned measurement data such as $L^*,a^*,b^*$ values and other measured color values, and descriptive data such as color codes of vehicles, or color names. The formula database can also comprise formulas associated with descriptive data such as vehicle identification numbers (VINs), part of VINs, or a combination thereof. The color data in the formula database need to be compatible with the target color data. In one example, the target color data comprise $L^*a^*b^*$ values and a color code, and the formula database comprises formulas associated with the color data comprising $L^*a^*b^*$ values and color codes. In another example, the target color data comprise $L^*a^*b^*$ values and are associated with a VIN, and the formula database comprises formulas associated with the color data comprising $L^*a^*b^*$ values and associated with VINs. In yet another example, the target color data comprise $L^*a^*b^*$ values and a combination of a color code and VIN, and the formula database comprises formulas associated with the color data comprising $L^*a^*b^*$ values and associated with color codes and VINs. In another example, the preliminary matching formulas can also be retrieved based on a color code of a vehicle, a vehicle identification number (VIN), a part of the VIN, or a combination thereof.

The preliminary matching formulas can also be retrieved by using the color data and coarseness value that is higher or lower than the target coarseness value. This can provide a flexibility to obtain more preliminary matching formulas for comparison. For example, a preliminary matching chip having a chip ID value of L4C3 can be determined to match the target coating. The preliminary matching formulas can be retrieved using coarseness values of C2, C3 and C4. In another example, a preliminary matching chip having a chip ID value of L4C3 can be determined to match the target coating. The preliminary matching formulas can be retrieved using coarseness values of C2, C3 or C4.

The matching formulas can be produced by selecting from the preliminary matching formulas.

The matching images can be generated based on the preliminary matching formulas and coarseness values associated with those preliminary matching formulas. The matching image can be generated by using the coarseness values and by converting the L,a,b, or $L^*,a^*,b^*$, values associated with each of the preliminary formulas to XYZ values if needed and calculating corresponding R, G, B values from the XYZ values as described in WO 2004/044850. The matching image can also be generated by retrieving from an image database one or more stored images based on the color data and the target coarseness values, wherein the image database comprises stored images of coatings associated with formulas, color data, and coarseness values. The aforementioned descriptive data and lightness values can also be comprised in the image database and be associated with the stored images.

The matching images can also be generated and displayed as realistic matching images. A realistic matching image can be a simulated image representing an object or part of an object being viewed in 3-dimensional conditions. A realistic matching image can also be a simulated image representing an object or part of an object being viewed under one or more illumination conditions, one or more viewing angles, or a combination thereof. The realistic matching image can simulate color and appearance such as coarseness of a matching coating on a curved surface, under one or more illumination conditions, or under one or more specific orientations. Methods for generating realistic images are described in detail in a commonly owned U.S. Patent Publication No. 2007/0097119, hereby incorporated in by reference. For modified matching formulas, modified matching images can be generated and displayed. The modified matching images can also be generated and displayed as realistic modified matching images.

The display device can be any of the aforementioned display devices. In one example, the display devise can be a display screen of a laptop computer. In another example, the display device can be a color screen of a PDA, such as a Blackberry® available from Research In Motion Limited, Waterloo, Ontario, Canada, under registered trademark. The matching images can be displayed individually or grouped together for easy comparison.

The one or more matching formulas can be produced (112) by selecting from said preliminary matching formulas based on the comparison of said matching images and said target coating. An operator can select one or more matching formulas from the preliminary matching formulas by visual comparison. The selection can be entered into the computing device. The matching formulas can be output to a data output device.

The method of this disclosure can also comprise the steps of:
  a) providing a set of coating chips each having a chip coating layer thereon and a coarseness value and a lightness value corresponding to coarseness and lightness of said chip coating layer, said set of coating chips comprise at least two coating chips having different lightness values, and at least two coating chips having matching lightness values and different coarseness values;

b) obtaining target color data of said target coating and producing a target lightness value based on said target color data;

c) obtaining a target coarseness value of said target coating by a coarseness determination process consisting of the steps of: i) selecting from said coating chips one or more preliminary matching chips having lightness values that match the target lightness value, ii) selecting from said preliminary matching chips one or more matching chips by comparing chip coating layers of said preliminary matching chips with the target coating, and iii) producing said target coarseness value based on coarseness values of the matching chips;

d) retrieving one or more preliminary matching formulas from a formula database based on the target color data and the target coarseness value, said formula database comprises coating formulas associated with color data, coarseness values, and lightness values;

e) generating one or more matching images based on said preliminary matching formulas and coarseness values associated with said preliminary matching formulas and displaying said matching images on a display device;

f) generating a target image based on the target color data and said target coarseness value and displaying said target image on said display device; and g) produce said one or more matching formulas by selecting from said preliminary matching formulas based on the comparison of said matching images and said target image or said target coating.

The operator can select the matching formulas by comparing the matching images with the target coating or by comparing the matching images with the target image.

The target image can be generated as a realistic target image using the method described before.

The method disclosed herein can further comprise the steps of producing one or more matching coating compositions (113) based on said one or more matching formulas, and applying at least one of said matching coating compositions over at least a portion of said substrate to produce a matching coating thereon (114). The matching coating composition can comprise one or more effect pigments. Examples of effect pigments can include metallic flakes, such as aluminum flakes.

The target coating can comprise a color coat layer, a clearcoat layer, or a combination of a color coat layer and a clearcoat layer. The color coat layer can be formed from a color coat composition. The clearcoat layer can be formed from a clearcoat coating composition. The target coating can be formed from one or more solvent borne coating compositions, one or more waterborne coating compositions, one or more two-pack coating compositions or one or more one-pack coating compositions. The target coating can also be formed from one or more coating compositions each having a crosslinkable component and a crosslinking component, one or more radiation curable coating compositions, or one or more lacquer coating compositions.

The substrate can be a vehicle body or parts of a vehicle body. The substrate can also be any coated articles having coating layers comprising effect pigments that impart coarseness appearance.

This disclosure is also directed to a system for matching color and appearance of a target coating on a substrate. The system can comprise:

1) a set of coating chips each having a chip coating layer thereon and a coarseness value and a lightness value corresponding to coarseness and lightness of said chip coating layer, said set of coating chips comprise at least two coating chips having different lightness values, and at least two coating chips having matching lightness values and different coarseness values.

The system of this disclosure can further comprise:

2) a color measuring device;

3) a computing device having a display device;

4) a formula database comprising coating formulas associated with color data, coarseness values, and lightness values, said formula database is accessible from said computing device; and 5) a computer program product that that is accessible to the computing device for performing a computing process comprising the steps of:

a) receiving target color data of said target coating;

b) receiving a target coarseness value of said target coating;

c) retrieving one or more preliminary matching formulas from said formula database based on the target color data and the target coarseness value; and d) generating one or more matching images based on said preliminary matching formulas and coarseness values associated with said preliminary matching formulas; and e) displaying at least one of said matching images on said display device.

The computing process can further comprise the steps of generating a target image based on said target color data and said target coarseness value, and displaying the target image on the display device.

The computing process of the system can further comprise the step of:

f) receiving an input to select one or more matching formulas from said preliminary matching formulas.

The computing process of the system can further comprise the step of:

g) outputting said one or more matching formulas to a data output device.

The data output device can be the display device, a data storage device, such as a hard drive or a memory device, a printer, another computing device, or a paint mixing device.

The color measuring device of the system can be a colorimeter, a spectrophotometer, a goniospectrophotometer, or a color-appearance dual measuring device. The computing device can be a portable computing device. The formula database can be accessible from said computing device either by residing within said computing device or by functionally coupled to said computing device via wired or wireless connections. Connections between the computing device and the color measuring device can also be a wired or wireless connection. Data can also be transferred among the devices via wired or wireless connection, memory devices such as a flash memory device, or any other data transfer devices known to or developed by those skilled in the art.

The system can further comprise an appearance measuring device or a color-appearance dual measuring device. The system can even further comprise one or more input devices for inputting data into said computing device, such as a keyboard, a touch screen, a digital writing pad, another computing device, or any other digital or analog devices that can enter data into a computing device; one or more output devices, such as a monitor, a printer, a projector, a hard drive, a database, a portable data device, another computing device or any other digital or analog devices that can receive data from a computing device; or a combination thereof.

The system can further comprise one or more databases comprising customer data, work history data, stored target images of one or more target coatings, stored matching images, stored modified matching formulas, or stored modified matching images. The computing device of the system can be a stand alone computing device, such as a desktop computer, a laptop computer, or a PDA that has aforementioned databases and computing program products installed. The computing device can also be a client computing device in a host-client computing system in that the client computer has access to a host computer via wired or wireless connections. The color measuring device or the appearance measuring device can have wired or wireless connections to the computing device or the host computer in a client-host computing system.

The coating chips of the system can be produced on paper, plastic, fabric, polymeric or metal materials. The coating chips can be produced on a thin substrate made of any of the aforementioned materials. The coating chips can be in a square, an oval, a circular, or any other shapes. Multiple chips can be arranged or assembled in a strip or a fandeck form. The chips can have one or more viewing openings through the coating layer and the thin substrate.

The coating layer can comprise a color coat layer formed from a color coat coating composition. The color coat layer can comprise one or more effect pigments. In one example, the effect pigment is selected from metallic pigments, pearlescent pigments, or a combination thereof. The coating layer can further comprise a clearcoat layer formed form a clearcoat composition.

The coating layer of each of the coating chips can be formed at different lightness and coarseness. Colored tints, such as black tints can be used to shade the color coat layer into different lightness. Examples of the color tints can include MasterTint® Tint system available from DuPont, Wilmington, USA, under registered trademark. Effect pigments such as aluminum flakes can be used to produce different levels of coarseness of the color coat layer. Examples of effect pigments can include aluminum tints available from aforementioned Master® Tint system from DuPont. The lightness and the coarseness can also be produced by a combination of colored tints and the effect pigments.

The range of lightness and coarseness can be determined based on lightness and coarseness values of articles available. In automobile refinish industry, coatings of a number of selected vehicles can be measured or provided by vehicle manufacturers. The selected vehicles can include different makes, models, manufacturing years, and manufacturing sites. Measurements of vehicles can be done at railway heads, vehicle transportation hubs, import harbors for imported foreign vehicles, or any other places or facilities where a large number and variety of vehicles can be accessed. In one example, a chip ID L1 can represent the lightest lightness value, a chip ID L5 can represent the darkest lightness value, and chip IDs L2-L4 can represent intermediate lightness values between L1 and L5. Each of the lightness values can be achieved by formulating coating compositions using different amounts of tints, such as the aforementioned black tints. In the same example, a chip ID C1 can represent the finest coarseness value, a chip ID C5 can represent the coarsest coarseness value, and chip IDs C2-C4 can represent intermediate coarseness values between C1 and C5. Each of the coarseness values can be achieved by using different types, size, or a combination of different types or sizes of effect pigments, such as various aluminum flakes. If desired, more values of lightness and/or coarseness can be used. In further example, 10 lightness values can be used in a chip set. In another example, 10 coarseness values can be used in a chip set. In yet another example, 10 lightness values and 10 coarseness values can be used in a chip set.

The coating chips can be produced by spraying a color coat coating composition having desired lightness and coarseness onto a substrate, such as a panel of paper, plastic, polymeric, or metal, to form a color coat layer. A layer of clearcoat can be applied over the color coat layer. The color coat layer and the clearcoat layer can be cured or dried individually or simultaneously. In one example, a set of 25 coating chips having a combination of 5 lightness values and 5 coarseness values can be produced.

Each of the coating layers can be formed from one or more solvent borne coating compositions, one or more waterborne coating compositions, one or more two-pack coating compositions, or one or more one-pack coating compositions. Each of the coating layers can also be formed from one or more chemical curable coating compositions each comprising a crosslinkable component and a crosslinking component, one or more radiation curable coating compositions, one or more lacquer coating compositions, or one or more thermal curable coating compositions.

The computing process of the system disclosed herein can further comprise the steps of modifying said one or more matching formulas to produce one or more modified matching formulas, generating one or more modified matching images based on said modified matching formulas, and displaying at least one of said modified matching images on said display device.

The method and the system disclosed herein can be used for any coated articles having coating layers comprising effect pigments. Some examples of such coated articles can include, but not limited to, home appliances, such as refrigerator, washing machine, dishwasher, microwave ovens, cooking and baking ovens; electronic appliances, such as television sets, computers, electronic game sets, audio and video equipments; recreational equipments, such as bicycles, ski equipments, all terrain vehicles; and home or office furniture, such as tables, file cabinets; water vessels or crafts, such as boats, yachts, or personal watercrafts (PWCs); aircrafts; buildings; structures, such as bridges; industrial equipments, such as cranes, heavy duty trucks, or earth movers; or ornamental articles.

What is claimed is:

1. A method for matching color and appearance of a target coating on a substrate, said method comprising the steps of; a) providing a set of coating chips each having a chip coating layer thereon and a coarseness value and a lightness value corresponding to coarseness and lightness of said chip coating layer, said set of coating chips comprise at least two coating chips having different lightness values, and at least two coating chips having matching lightness values and different coarseness values; b) obtaining target color data of said target coating and producing a target lightness value based on said target color data; c) obtaining a target coarseness value of said target coating by a coarseness determination process comprising the steps of: i) selecting from said coating chips one or more preliminary matching chips having lightness values that match the target lightness value, ii) selecting from said preliminary matching chips one or more matching chips by comparing chip coating layers of said preliminary matching chips with the target coating, and iii) producing said target coarseness value based on coarseness values of the matching chips; and d) retrieving one or more preliminary matching formulas from a formula database based on the target color data and the target coarseness value, said formula database comprises coating formulas associated with color data, coarseness values, and lightness values, wherein said target color data or said target lightness value comprise measurement data produced from a color measuring device, wherein said color measuring device is a colorimeter, a spectrophotometer or a goniospectrophotometer.

2. The method of claim 1 further comprising the step of producing one or more matching formulas by selecting from said preliminary matching formulas.

3. The method of claim 2 further comprising the steps of producing one or more matching coating compositions based on said one or more matching formulas.

4. The method of claim 3 further comprising the step of applying at least one of said matching coating compositions over at least a portion of said substrate to produce a matching coating thereon.

5. The method of claim 3, wherein said matching coating composition comprises one or more effect pigments.

6. The method of claim 2 further comprising the steps of modifying said one or more matching formulas to produce one or more modified matching formulas, generating one or more modified matching images, and displaying at least one of said modified matching images on said display device.

7. The method of claim 6, wherein at least one of said modified matching images is generated and displayed as a realistic modified matching image.

8. The method of claim 1 further comprising the step of:
e) generating one or more matching images based on said preliminary matching formulas and coarseness values associated with said preliminary matching formulas and displaying said matching images on a display device.

9. The method of claim 8 further comprising the step of:
f) producing one or more matching formulas by selecting from said preliminary matching formulas based on the comparison of said matching images and said target coating.

10. The method of claim 8, wherein at least one of said matching images is generated and displayed as a realistic matching image.

11. The method of claim 8 further comprising the steps of:
g) generating a target image based on the target color data and said target coarseness value and displaying said target image on said display device; and
h) producing one or more matching formulas by selecting from said preliminary matching formulas based on the comparison of said matching images with said target image, or based on the comparison of said matching images with said target coating.

12. The method of claim 11, wherein said target image is generated and displayed as a realistic target image.

13. The method of claim 1, wherein said target color data comprises spectral reflectance values, XYZ values, L,a,b values, L*,a*,b* values, L,C,h values, or a combination thereof.

14. The method of claim 13, wherein said target color data further comprises a color code of a vehicle, a color name, or a combination thereof.

15. The method of claim 1, wherein said target lightness value comprises measurement data produced from a color measuring device, an appearance measuring device, or a color-appearance dual measuring device.

16. The method of claim 1, wherein said substrate is a vehicle body or parts of a vehicle body.

17. The method of claim 1, wherein said target coating is formed from one or more solvent borne coating compositions or one or more waterborne coating compositions.

18. The method of claim 1, wherein said target coating is formed from one or more two-pack coating compositions or one or more one-pack coating compositions.

19. The method of claim 1, wherein said target coating is formed from one or more coating compositions each having a crosslinkable component and a crosslinking component, one or more radiation curable coating compositions, or one or more lacquer coating compositions.

20. The method of claim 1, wherein said target coating comprises a color coat layer, or a combination of a color coat layer and a clearcoat layer.

* * * * *